United States Patent [19]

Klimas et al.

[11] Patent Number: 4,970,178
[45] Date of Patent: Nov. 13, 1990

[54] LEAD-FREE GLASS FRIT COMPOSITIONS

[75] Inventors: David A. Klimas, Bridgeville; Boyd R. Frazee, Washington, both of Pa.

[73] Assignee: Ciba-Geigy Corporation, Ardsley, N.Y.

[21] Appl. No.: 394,241

[22] Filed: Aug. 14, 1989

Related U.S. Application Data

[63] Continuation of Ser. No. 330,985, Mar. 23, 1989, abandoned, which is a continuation of Ser. No. 256,161, Oct. 7, 1988, abandoned, which is a continuation of Ser. No. 180,003, Apr. 5, 1988, abandoned, which is a continuation of Ser. No. 926,072, Nov. 3, 1986, abandoned.

[51] Int. Cl.$^5$ .......................... C03C 8/04; C03C 8/06; C03C 3/093; C03C 3/089
[52] U.S. Cl. ........................................ 501/26; 501/25; 501/58; 501/59; 501/65; 501/67
[58] Field of Search ....................... 501/26, 25, 58, 59, 501/65, 67

[56] References Cited

U.S. PATENT DOCUMENTS

| | | | |
|---|---|---|---|
| 2,799,590 | 7/1957 | Armistead | 106/53 |
| 4,312,951 | 1/1982 | Eppler | 501/26 |
| 4,316,963 | 2/1982 | Hommel et al. | 501/26 |
| 4,340,645 | 7/1982 | O'Conor | 501/26 |
| 4,349,635 | 9/1982 | Davis et al. | 501/26 |
| 4,361,654 | 11/1982 | Ohmura et al. | 501/26 |
| 4,417,913 | 11/1983 | Davis et al. | 65/59.1 |

FOREIGN PATENT DOCUMENTS 1013597 12/1965 United Kingdom.
2092123 8/1982 United Kingdom.

*Primary Examiner*—Mark L. Bell
*Attorney, Agent, or Firm*—Harry Falber

[57] ABSTRACT

Lead-free glass frit compositions for use in vitreous coatings consisting essentially of $Na_2O$—$ZnO$—$B_2O_3$—$SiO_2$ in appropriate concentrations including molar amounts of at most 17.5 mole percent of $B_2O_3$ and at least 40 mole percent of $SiO_2$.

4 Claims, No Drawings

LEAD-FREE GLASS FRIT COMPOSITIONS

This application is a continuation, of application Ser. No. 330,985, filed 3/23/89, now abandoned, which is a continuation of Ser. No. 256,161, filed 10/7/88, now abandoned, which is a continuation of Ser. No. 180,603 filed 4/5/88 now abandoned, which in turn is a continuation of Ser. No. 926,072 filed 11/3/86, now abandoned.

Decorating compositions generally fall into two categories; glazes and enamels. The glazes are usually thought of as clear glasses, while enamels are glazes which contain a coloring material such as a pigment. In actual usage, the glazes and enamels are used in a finely divided form called a "frit", which is selectively applied to the surfaces of the glassware, glass-ceramic ware, chinaware and ceramic ware in accordance with the intended decorative or ornamental pattern. Any of several decorating techniques known in the industry can be used to achieve this result. Typically, the frit is in the form of a paste which consists of the finely divided glaze or enamel composition plus a vehicle. After application to the ware by silk screen or other technique, the ware is heated or fired to fuse the frit, to volatilize the vehicle or medium and to firmly bond the decoration to the surface of the ware.

There are a variety of decorating compositions available which are used in the decorating of glassware, chinaware and the like, to produce selected patterns and ornamentation. These available compositions frequently contain lead and/or cadmium oxides. Lead oxide was previously used in these compositions to lower the melting point of the frit so that the frit could be fused onto the surface of the ware at as low a temperature as possible to avoid thermal deformation of the ware. Cadmium oxide had been used in the past as a colorant in certain frits. However, adverse toxicological effects from these systems have resulted in various prohibitions on the use of lead and cadmium in decorative glazes. It has, therefore, been necessary to formulate glass frit products with equivalent or improved performance characteristics but with no lead or cadmium components.

A number of such lead-free products have been disclosed. By way of illustration, U.S. Pat. No. 4,376,169 discloses frits which require the presence of alkali oxide, $B_2O_3$, $Al_2O_3$, $SiO_2$, F, $P_2O_5$, ZnO and $TiO_2$ and which have critical compositional limits; U.S. Pat. No. 4,446,241 discloses frits which require the presence of $Li_2O$, $B_2O_{03}$ and $SiO_2$ among other oxides; U.S. Pat. No. 4,537,862 discloses frits which require the presence of $B_2O_3$, $SiO_2$, $ZrO_2$ and rare earth oxides with the weight ratio of $ZrO_2$ to rare earth oxides being critical; U.S Pat. No. 4,554,258 discloses frits which require the presence of $Bi_2O_3$, $B_2O_3$, $SiO_2$ and alkali metal oxides where the alkali metal oxides are necessarily present in specified concentrations and U.S. Pat. No. 4,590,171 discloses frits which require the presence of $Li_2O$, $Na_2O$, BaO, $Ba_2O_3$, $Al_2O_3$, $SiO_2$, $ZrO_2$ and F. It is thus seen that the formulations have varied the nature and concentration of the oxide components in an attempt to provide acceptable frit formulations. While such frits are alleged to exhibit a variety of desirable properties, they still exhibit deficiencies in one or more performance areas.

Accordingly, it is the primary object of this invention to provide lead-free glass frit compositions which exhibit a broad range of improved performance characteristics.

It is a further object to provide such frits which are low melting and are particularly resistant to acid attack.

Various other objects and advantages of this invention will become apparent from the following descriptive material.

It has now been surprisingly determined that the aforementioned objectives are met by preparing lead-free glass frits which consist of $Na_2O$, ZnO, $B_2O_3$ and $SiO_2$ in appropriate concentration ranges. Such systems meet the primary requirement of being operative in vitreous coatings without the presence of lead and cadmium components. In addition, these formulations exhibit a broad range of desirable properties including low melting points, sufficiently low thermal expansion to avoid crazing when applied over soda-lime-silica glass and low water solubility to facilitate their use in water based spray mediums. Of particular significance is the excellent resistance to acid attack, such as that encountered from various acid-containing liquids such as juice. As a result, these glass frit compositions are available for a broad range of glazing, enameling and decorating applications on a wide variety of glassware and chinaware. They can also be applied in a variety of printing methods.

More specifically, the glass frit compositions of this invention consist of

|  | Broad Range (mole %) | Preferred Range (mole %) |
| --- | --- | --- |
| $Na_2O$ | 3.9–18.5 | 5.0–14.0 |
| ZnO | 4.0–30.0 | 8.0–25.0 |
| $B_2O_3$ | 3.9–17.5 | 6.0–13.0 |
| $SiO_2$ | 40.0–74.0 | 45.0–60.0 |

It is particularly to be noted that coatings which significantly exceed the 17.5 mole percent $B_2O_3$ concentration do not exhibit the minimum level of acid resistance required for such products. In addition, coatings which contain less than the minimum 40.0 mole percent $SiO_2$ content are likewise deficient in acid resistance.

In addition to the oxides listed above, the coatings may contain one or more of the following without adversely effecting the performance characteristics:

|  | mole percent |
| --- | --- |
| $K_2O$ | 0–8.0 |
| $Li_2O$ | 0–5.0 |
| CaO | 0–8.0 |
| SrO | 0–8.0 |
| BaO | 0–9.0 |
| $Bi_2O_3$ | 0–10.0 |
| $Al_2O_3$ | 0–4.0 |
| $ZrO_2$ | 0–6.0 |
| $TiO_2$ | 0–7.0 |
| $MoO_3$ | 0–1.0 |
| $WO_3$ | 0–1.0 |
| $F_2$ | 0–4.0 |

The $K_2O$ and $Li_2O$ will generally replace a portion of the $Na_2O$ content. The $K_2O$ will tend to increase the firing temperature and thermal expansion, while the $Li_2O$ will lower the firing temperature but may create some thermal stresses. The CaO, SrO and BaO can be added as partial replacement for the ZnO, such components increasing firing temperature and thermal expansion. Additions of $ZrO_2$ will improve alkali resistance, while the $TiO_2$ will improve acid resistance.

The glass frits can be prepared by mixing together the oxide producing materials, such materials being well known to those skilled in the art, charging the raw material mix into a glass melting furnace at temperatures of 1000–1200° C. to produce the fused glass and then fritting the glass as by pouring into water or passing through water-cooled rolls. If required, the frit can be ground into powder by conventional grinding techniques. The resulting products generally have melting points in the range of 450 to 600° C. and coefficients of thermal expansion in the range of 70 to $90 \times 10^{-7}$ per °C.

The frits of the present invention are particularly useful for vitrifiable glass decorating colors, but they may also be used in related applications such as coatings on ceramic substrates. For example, to use these materials as a glass decorating color, a slip made up of the frit of the present invention, titanium dioxide and an alcohol-water mixture is prepared. This slip is then applied to the exterior of a glass jar or a light bulb (e.g. by spraying) and the coated surface is then fired at 680° C. for three minutes. The result is a smooth vitreous coating which will resist attack from a variety of acidic and alkaline materials. It is also to be noted that colorants and pigments can be dissolved and/or suspended in the frits to yield colored glazes and enamels.

The following examples further illustrate the embodiments of this invention. In these examples, known techniques are utilized to mix the appropriate raw batch glass compositions, to melt them at generally about 1200° C. for about 45 minutes and then to frit the compositions.

Testing is conducted by adding 4.0 grams of the glass frit to 1.0 gram of a pine oil-based medium and screen printing the resulting dispersion onto glass slides at a wet thickness of 2 mils. The slides are fired at several temperatures to determine "Gloss Temperature", i.e. the lowest temperature which enables the glass powder to flow sufficiently to form a smooth transparent coating.

Acid resistance is evaluated first by utilizing ASTM C724-81 and then by immersing the coated glass slides in 4% acetic acid for a period of 24 hours. Coatings rated "A" in the first test and coatings which are not etched or only marginally etched in the second test are deemed to be acid resistant.

Typical frit formulations on this invention and one control formulation and their attendant performance characteristics are noted in the following table.

| Ingredient | Formulation (mole %) | | | | | | |
|---|---|---|---|---|---|---|---|
| | 1 | 2 | 3 | 4 | 5 | 6 | A |
| $Na_2O$ | 12.1 | 11.4 | 12.1 | 11.4 | 11.4 | 5.7 | 13.2 |
| ZnO | 18.2 | 17.2 | 13.7 | 17.1 | 8.6 | 17.2 | 13.2 |
| $B_2O_3$ | 12.2 | 11.4 | 12.1 | 17.1 | 17.1 | 17.1 | 21.0 |
| $SiO_2$ | 54.5 | 51.4 | 54.6 | 51.5 | 51.4 | 51.4 | 47.4 |
| $TiO_2$ | 3.0 | 2.9 | 3.0 | 2.9 | 2.9 | 2.9 | 3.9 |
| $Li_2O$ | — | — | 4.5 | — | — | — | — |
| $K_2O$ | — | — | — | — | — | 5.7 | — |
| $Bi_2O_3$ | — | 5.7 | — | — | — | — | — |
| BaO | — | — | — | — | 8.6 | — | — |
| $F_2$ | — | — | — | — | — | — | 1.3 |
| Gloss Temp (°C.) | 650 | 607 | 621 | 650 | 677 | 650 | 621 |
| Acid Rating | A | A | A | A | A | A | C |
| 4% Acetic Acid | not etched | not etched | not etched | sl. etch | sl. etch | sl. etch | coating removed |

These results thus indicate the excellent performance benefits of the instant systems, particularly in the area of acid resistance. In addition, the results of control Formulation A illustrate the adverse effects obtained by utilizing $B_2O_3$ in excess of the prescribed amounts.

A similar composition can be prepared using, on a mole percent basis, 13.1% $Na_2O$, 19.7% ZnO, 8.2% $B_2O_3$ and 59.0% $SiO_2$, with the expectation of comparable performance characteristics.

Summarizing, this invention is seen to provide lead-free glass frit compositions exhibiting excellent performance characteristics particularly in the area of acid resistance. Variations may be made in procedures, proportions and materials without departing from the scope of the invention as defined by the following claims.

What is claimed is:

1. A lead-free glass grit composition consisting essentially of the following components in the indicated molar percent amounts:

| | |
|---|---|
| $Na_2O$ | 5.0–14.0 |
| ZnO | 8.0–25.0 |
| $B_2O_3$ | 6.0–13.0 |
| $SiO_2$ | 45.0–60.0 |
| $K_2O$ | 0–8.0 |
| $Li_2O$ | 0–5.0 |
| CaO | 0–8.0 |
| SrO | 0–8.0 |
| BaO | 0–9.0 |
| $Bi_2O_3$ | 0–10.0 |
| $Al_2O_3$ | 0–4.0 |
| $ZrO_2$ | 0–6.0 |
| $TiO_2$ | 0–7.0 |
| $WO_3$ | 0–1.0. |

2. The composition of claim 1 consisting essentially of the following components in the indicated mole percent amounts:

| | |
|---|---|
| $Na_2O$ | 12.1 |
| ZnO | 18.2 |
| $B_2O_3$ | 12.2 |
| $SiO_2$ | 54.5 |
| $TiO_2$ | 3.0. |

3. The composition of claim 1 consisting essentially of the following components in the indicated mole percent amounts:

| | |
|---|---|
| $Na_2O$ | 11.4 |
| ZnO | 17.2 |
| $B_2O_3$ | 11.4 |
| $SiO_2$ | 51.4 |
| $TiO_2$ | 2.9 |
| $Bi_2O_3$ | 5.7. |

4. The composition of claim 1 consisting essentially of the following components in the indicated mole percent amounts:

| | |
|---|---|
| $Na_2O$ | 12.1 |
| ZnO | 13.7 |
| $B_2O_3$ | 12.1 |
| $SiO_2$ | 54.6 |
| $TiO_2$ | 3.0 |
| $Li_2O$ | 4.5. |

* * * * *